Nov. 10, 1970  L. W. WIGHTMAN ET AL  3,538,598
METHOD FOR ASSEMBLY OF BALL BEARING ELECTRIC MOTORS
Filed Sept. 23, 1968  5 Sheets-Sheet 4
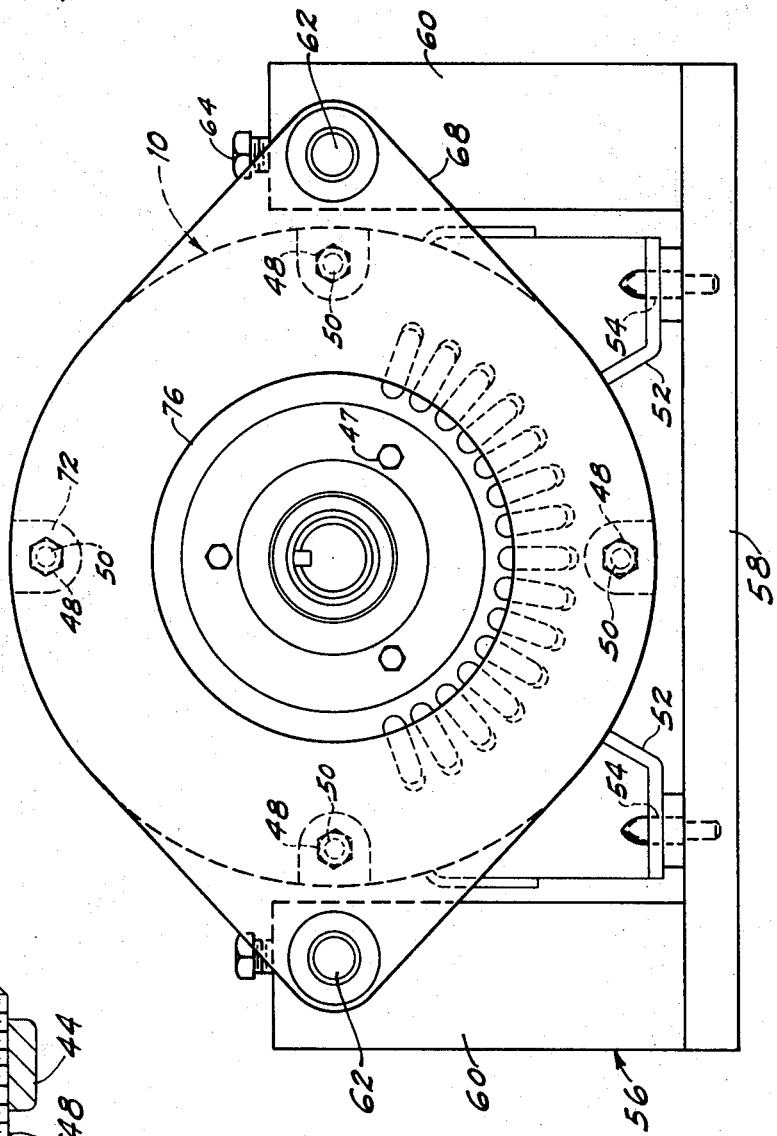
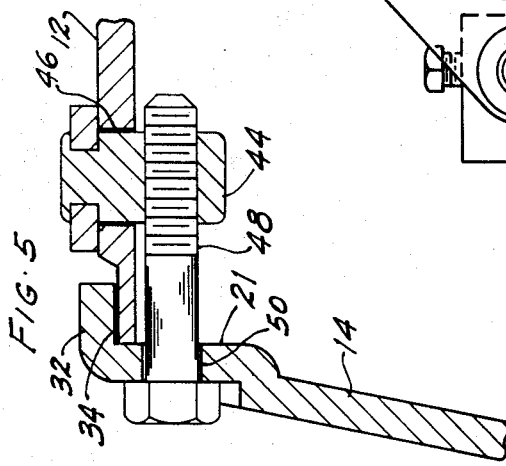
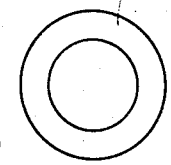
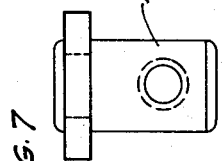
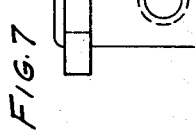
INVENTORS
LAWRANCE W. WIGHTMAN
MICHAEL J. LACY
BY Charles E. Markham
THEIR AGENT

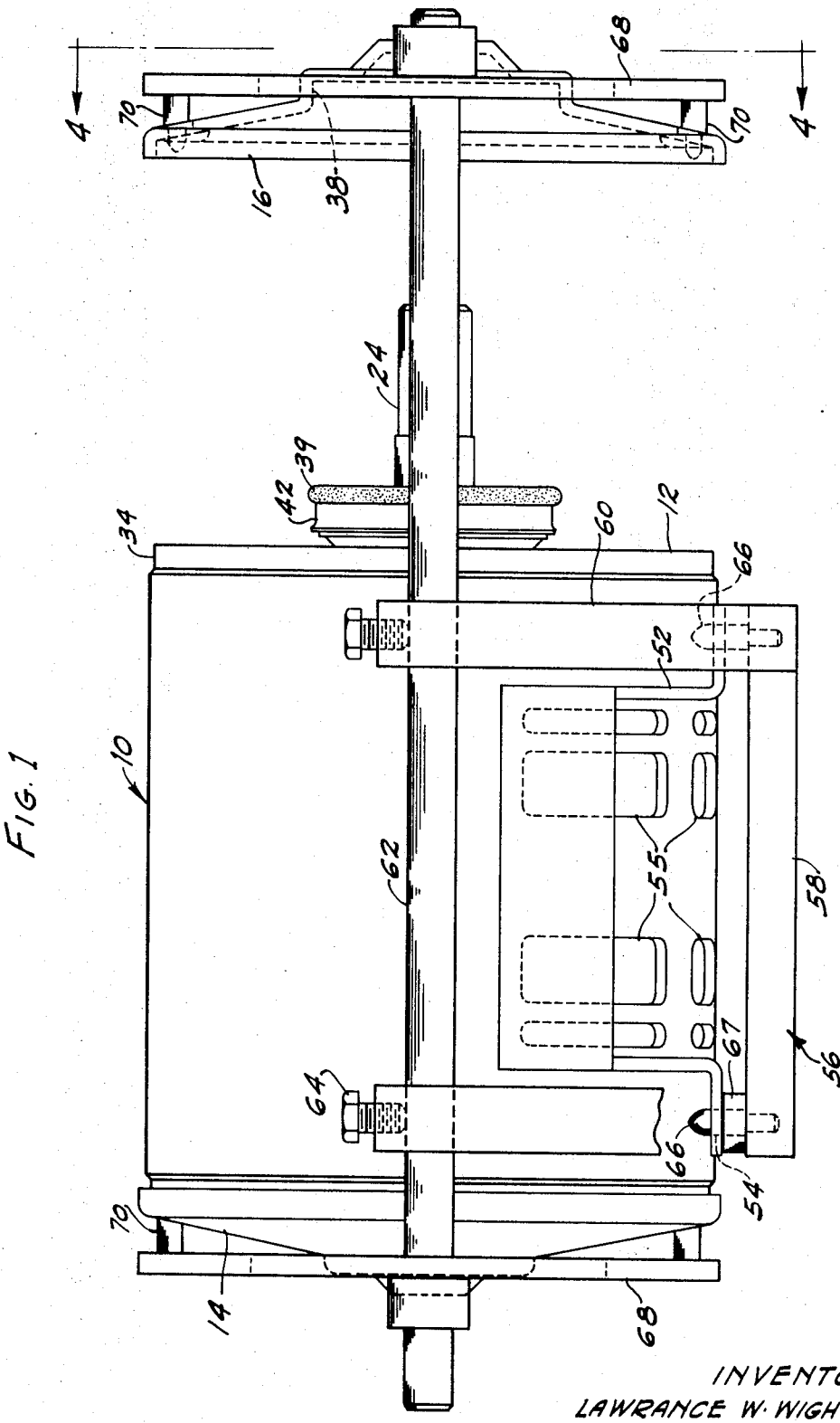

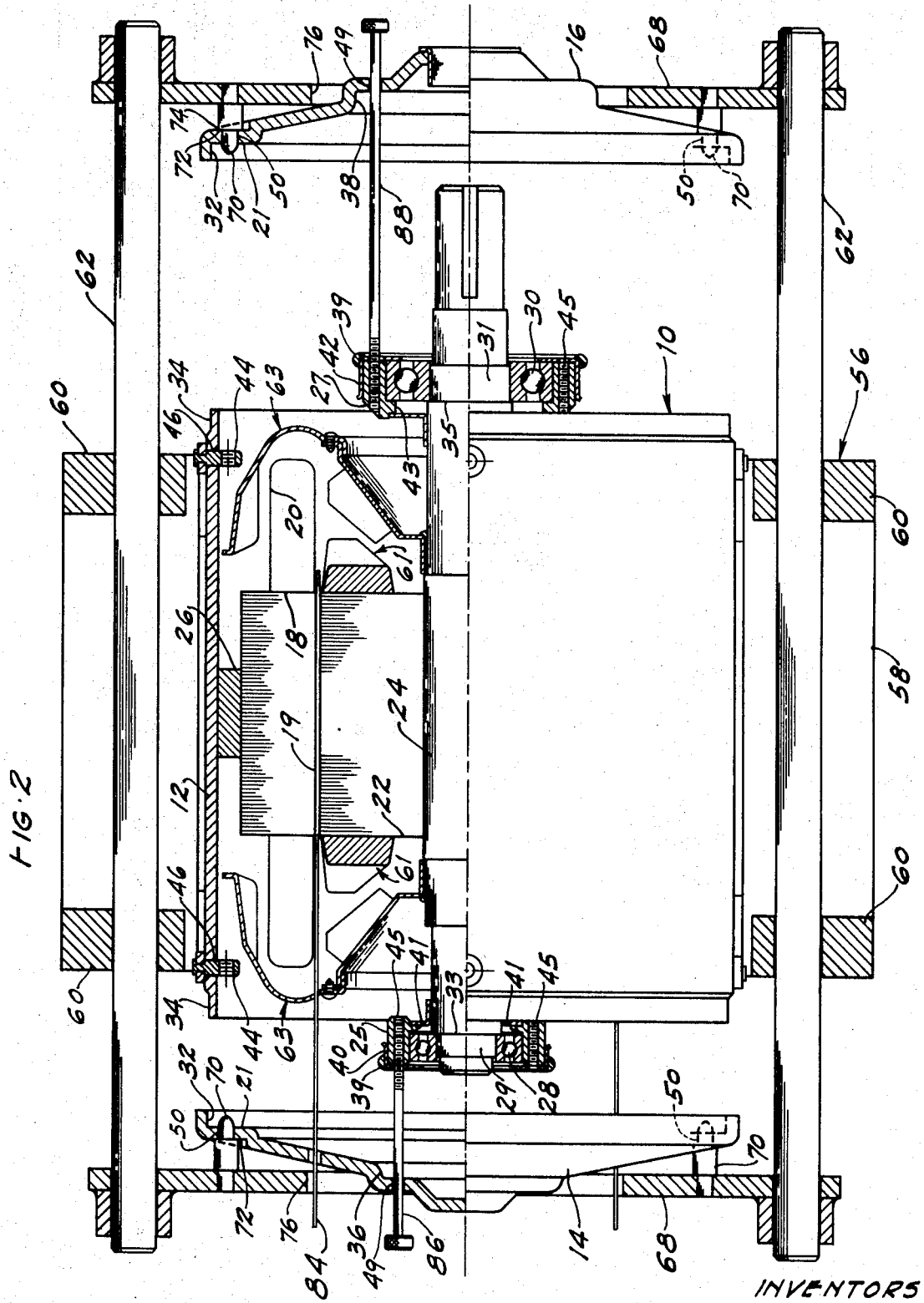

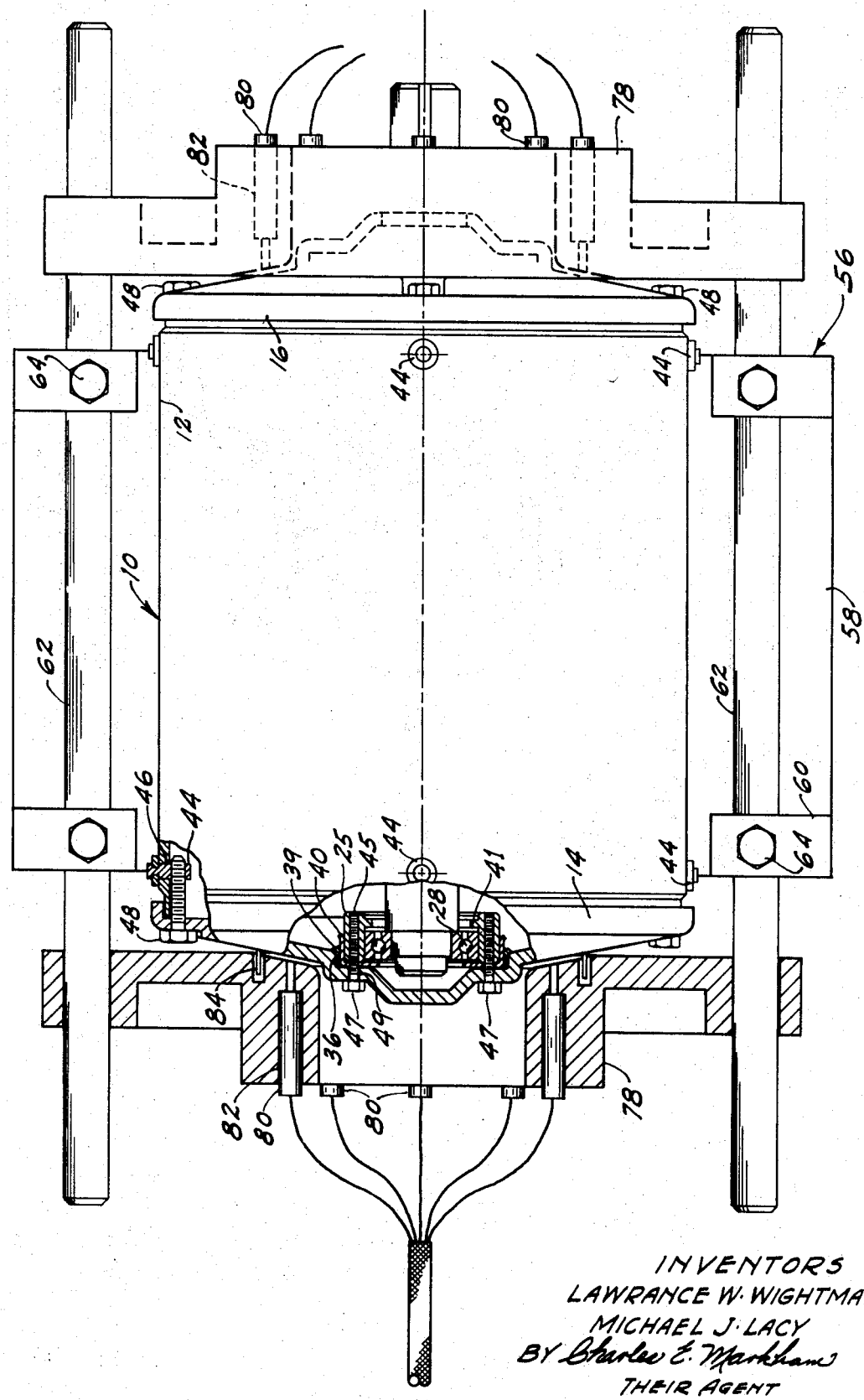

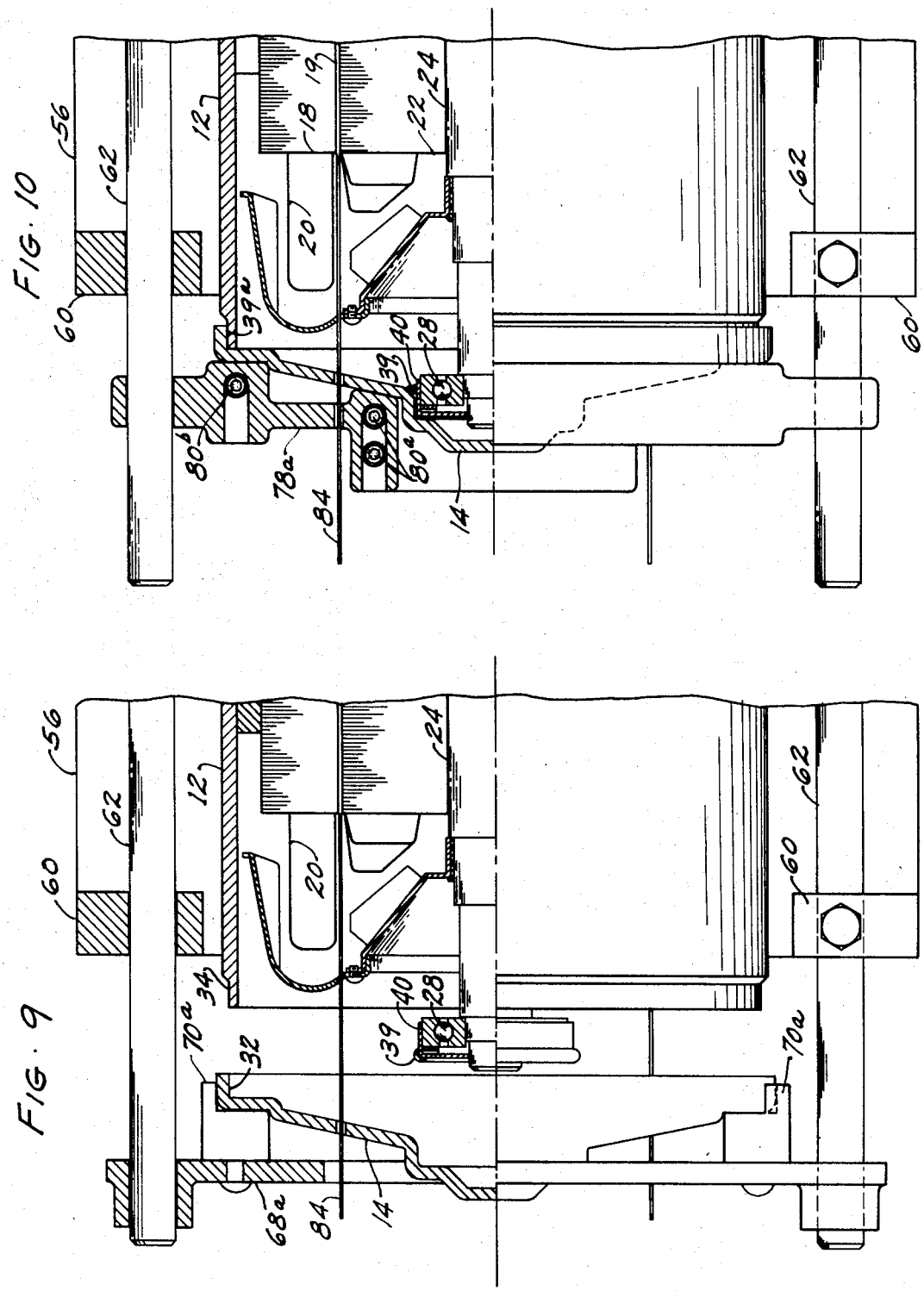

United States Patent Office 3,538,598
Patented Nov. 10, 1970

3,538,598
METHOD FOR ASSEMBLY OF BALL BEARING ELECTRIC MOTORS
Lawrence W. Wightman, Creve Coeur, and Michael J. Lacy, Florissant, Mo., assignors to Emerson Electric Co., St. Louis, Mo., a corporation of Missouri
Filed Sept. 23, 1968, Ser. No. 761,555
Int. Cl. H02k 15/00
U.S. Cl. 29—596                                    7 Claims

ABSTRACT OF THE DISCLOSURE

A method for assembling ball bearing electric motors in which the inner bearing races are fixed on the rotor shaft and the outer races are slip fitted into locating rings, in which the bearing locating rings are loosely entered into and cemented in central recesses in bearing supporting end shields, which end shields have peripheral surfaces interfitting with peripheral surfaces on the stator assembly concentric with the stator bore; the method consisting in slip fitting the locating rings on the outer bearing races, fixing the rotor concentrically and axially in the stator bore with shims, applying heat curing cement to the outer surfaces of the locating rings, moving the end shields inward in axial alignment with the stator to enter the locating rings into the recesses therein and to engage the interfitting peripheral surfaces of the end shields and the stator assembly, applying heat locally to the cemented joints to harden the cement and then removing the shims.

---

This invention relates to a method for assembling electric motors, and particularly ball bearing electric motors having the bearings fixed on the rotor shaft and employing cemented annular joints between the bearings and bearing supporting end shields in which to accumulate variations from concentricity and alignment due to manufacturing tolerances. An electric motor of this kind is shown and described in the co-pending application of common assignee, Ser. No. 752,562, filed Aug. 14, 1968, by Lawrance W. Wightman and Eugene F. Paul.

An object of the present invention is to provide a method of assembling electric motors employing annular cemented joints which insures a high degree of concentricity of the rotor in the stator bore and bearing alignment and uniformly solid cemented joints.

A further object is to provide a method of heat curing annular cemented joints in an electric motor without subjecting the entire motor to the temperatures required to heat cure the cement.

Other objects and advantages will appear from the following description when read in connection with the accompanying drawings.

In the drawings:
FIG. 1 is a side elevational view of a partially assembled electric motor shown associated with an assembly fixture constructed so as to effect an assembly of the motor in accordance with the present invention;

FIG. 2 is a partially sectionalized plan view of the electric motor and assembly fixture shown in FIG. 1;

FIG. 3 is a partially sectionalized plan view of the electric motor in fully assembled condition and of the assembly fixture equipped with heating elements for curing the annular cemented joints;

FIG. 4 is an end elevational view taken along line 4—4 of FIG. 1;

FIG. 5 is an enlarged fragmentary sectional view showing one form of detachably connecting the end shields to the stator shell;

FIGS. 6, 7, and 8 are top plan, elevational, and bottom plan views, respectively, of the removable nuts employed in detachably connecting the end shields to the stator casing; and FIGS. 9 and 10 are fragmentary sectional views showing an alternate method of connecting the end shields to the stator casing and means for heat curing the smaller diameter annular cemented joints surrounding the bearings and the larger diameter annular cemeted joints connected the end shields to the stator casing.

Referring to the drawings in more detail, an electric motor, generally indicated at 10, is shown partially assembled in FIGS. 1 and 2 and completely assembled in FIG. 3. The motor 10 has a casing comprising a cylindrical stator shell 12 and detachably connected circular end shields 14 and 16, a stator comprising a laminated core 18 with an axial bore 19 and windings 20, and a rotor comprising laminations 22 and a shaft 24 mounted for rotation in the stator bore. The stator core 18 has a mounting ring 26 press fitted thereon, which ring in turn is fitted into the stator shell 12 and fixed therein by any suitable means, such as press fitting and pinning or welding, thereby to rigidly fix the stator in the shell 12, see FIG. 2. The rotor shaft 24 is provided with ball bearings 28 and 30 supported in the end shields 14 and 16. The inner races of ball bearings 28 and 30 are press fitted on accommodating diameter shaft portions 29 and 31, respectively, near opposite ends of shaft 24, and abut shoulders 33 and 35 which accurately position the bearings axially on the shaft.

The circular end shields 14 and 16 have axially extending rim portions 32 at the peripheries thereof, the annular internal surfaces of which nicely fit over peripheral machined surfaces 34 at the ends of cylindrical shell 12 and internal faces 21 which abut the ends of stator shell 12. End shields 14 and 16 are further provided with central, circular, internal recesses 36 and 38 which loosely receive bearing locating rings 40 and 42, respectively. The ball bearings 28 and 30 are provided with bearing caps 25 and 27, respectively, which receive the outer races of the bearings in close slip fit relationship. The bearing caps 25 and 27 are provided with inner flanges 41 and 43 adapted to engage the inner faces of the outer bearing races. The bearing caps 25 and 27 are further provided with circularly arranged tapped holes 45 which receive machine screws 47 extending through clearance holes 49 in the bottoms of the end shield recesses 36 and 38. The bearing locating rings 40 and 42 receive the bearing caps 25 and 27 in slip fit relationship, and the annular spaces between the loosely fitting bearing locating rings and the walls of recesses 36 and 38 are filled with an adhesive, heat-cured, structural cement 39. The cement is applied in paste form and is heat cured to a hard set condition, thereby rigidly fixing the locating rings in recesses 36 and 38.

The end shields 14 and 16 are detachably connected to the ends of the stator shell 12 by means of nuts 44, the shanks of which are rectangular in cross section and are entered into circularly spaced rectangular holes 46 in stator shell 12 near its ends and by machine bolts 48 which pass through clearance holes 50 in the end shields and engage the nuts 44, see FIG. 5. The motor 10 is further provided with four feet 52 welded to the stator shell 12, and each foot is provided with a clearance hole 54 adapted to receive an anchor bolt. Suitable vents 53 and 55 are provided in the lower halves of the end shields and in the lower half of the stator casing, respectively, and suitable circulating fans attached to the rotor, generally indicated at 61 and 63, are provided.

The motor 10 is shown mounted on an assembly fixture generally indicated at 56. The assembly fixture 56 comprises a base plate 58, four upright members 60 welded at their lower ends to base plate 58, and two spaced horizontal guide rods each of which is slidably mounted in axially aligned bores in the upper ends of a pair of the upright members 60. The guide rods 62 are locked in any axially adjusted position by set screws 64. The fixture 56 is further provided with four upright locating pins 66 and spacers 67 mounted in the base 58.

In FIGS. 1 and 2 of the drawings, which show the motor 10 in a partially assembled condition, the fixture is provided with end shield carrier members 68 slidably mounted on opposite end portions of guide rods 62. The carrier members 68 are each provided with shouldered locating pins 70 circularly arranged about the axis of the fixture and support the end shields 14 and 16. The end shields are positioned on the fixture with their axes coinciding with the axis of the fixture by entry of the locating pins 70 in the clearance holes 50 in the end shields, and the end shields are positioned perpendicular to the axis of the fixture by abutment of the flat surfaces 72 surrounding the clearance holes with the shoulders 74 on pins 70. The end shield carrier plates are each further provided with a large, central, clearance aperture 76.

In FIG. 3 of the drawings, which shows the motor 10 completely assembled, the fixture 56 is provided with a pair of heaters 78 in lieu of the end shield carrier member 68. The heaters 78 are slidably mounted on opposite end portions of rods 62, and each comprises a thick metal annulus, preferably of aluminum, having a plurality of circularly arranged heating elements 80 positioned so as to closely surround the cemented joints between the bearing locating rings 40 and 42 and the walls of the end shield recesses 36 and 38. The heating elements 80, illustrated, are commercially available electrical resistance heaters of cylindrical form and are inserted into circularly arranged bores 82 in annulus 78. The use of multiple small heating elements 80 provides a simple means of controlling or varying the temperature of the annulus 78 by merely adding or deleting one or more elements.

ASSEMBLY OF MOTOR CONSTRUCTION SHOWN IN FIGS. 1 TO 8

The stator having been previously assembled and fixed in the cylindrical casing 12 with the annular machined surfaces 34 concentric and in alignment with the stator bore 19 and the rotor having been previously assembled, including the assembly therewith of ball bearings 28–30 and bearing caps 25–27, as shown in FIG. 2, the completion of the motor assembly in accordance with the present invention is as follows:

The rotor is positioned concentrically in the stator bore, and axially with respect to the stator, by means of circularly spaced shims 84 placed in the air gap between the rotor and stator bore, and the bearing locating rings 40 and 42 are slip fitted on bearing caps 25 and 27. This assembly is then placed on the base 58 of fixture 56 with the locating pins 66 entering the holes 54 in the feet 52 on the stator casing with the feet resting on the spacers 67. This positions the axes of the rotor, the stator, and the fixture close to coaxial alignment.

A heat-curable, epoxy resin cement is now applied as a bead, in paste form, near the outboard edges of the bearing locating rings, as shown at 39 in FIGS. 1 and 2. The end shields 14 and 16 are then placed on the end shield carrier members 68 in outward spaced relationship with the ends of the stator casing and locating pins 70 entering the clearance holes 50 in the end shields. The locating pins 70 are arranged circularly so as to be in registry with the rectangular holes 46 in the stator shell, and the fit of the locating pins 70 in clearance holes 50 is such as to permit slight lateral movement of the end shields.

Temporary positioning screws 86 and 88 of suitable length, see FIG. 2, are now entered through clearance holes 49 in the bottoms of the end shield recesses and are threadedly engaged in the tapped holes 45 in the bearing caps. The clearance holes 49 in the end shields have the same circular spacing as the tapped holes 45 in the bearing caps, and the long, temporary positioning screws 86 and 88 are employed to maintain the clearance holes and tapped holes in registry during assembly.

The end shield carrier members 68 are then moved inward on guide bars 62, the rims 32 of the end shields slipping over and closely fitting the machined surfaces 34 and the internal faces 21 of the end shields abutting the ends of the stator casing 12. As the end shields are moved inward, the cementing material 39 is spread inward over the bearing locating rings to completely fill the annular spaces between the loosely fitting locating rings and the axial walls of the shield recesses 36 and 38. Moving the end shields inward in approximate alignment with the bearing locating rings insures a uniformly solid cemented joint, which may not otherwise occur if the end shields were not guided and permitted to shift laterally when assembling. When the end shields have been fitted on the ends of the stator casing, the long, temporary positioning screws 86 and 88 are removed from the bearing caps and permanent machine screws 47 are entered and tightened. The end shield carrier members are now removed and the rectangular nuts inserted in the rectangular holes 46 in the stator casing 12, and bolts 48 are entered and tightened. The heaters 78 are now slidably mounted on fixture rods 62 and moved into position to contact central circular portions of the exterior surfaces of the end shields closely surrounding the annular cemented joints, thereby to apply the required heat as locally as practical to heat cure the cement 39.

When the cement has hardened, the heaters are removed and the shims 84 are withdrawn through suitable clearance holes in one fan structure and in one end shield. If such clearance holes for the removal of the shims are found to be objectionable in some motor constructions, one end shield and adjacent fan structure may be removed to permit withdrawal of the shims. The removal and replacement of an end shield after the cement has set will not disturb the concentricity or alignment of the rotor and bearings because the bearing locating rings are now fixed with respect to the interfitting peripheral surfaces of the end shield and stator shell, which are concentric with the stator bore. In instances where an end shield is to be removed after the cement has hardened, for the purpose of removing the shims, connection of the end shield to the stator casing by bolts 48 and nuts 44 may be omitted while the cemented joint is being heat cured inasmuch as the fit of the end shield on the stator casing will maintain it in position.

In the motor construction shown in FIGS. 9 and 10, the bearing caps are omitted, the bearing locating rings being slip fitted over the outer races of the bearings. Also, the removable nuts 47 and bolts 48, detachably connecting the end shields to the stator casing, are deleted, and in lieu thereof, a thin film of adhesive, heat-curable cement 39a is applied in liquid form and dispersed over and between the interfitting surfaces of the end shields and stator casing by capillarity after the end shields have been assembled on the ends of the stator casing.

In FIG. 9 the end shield carrier members 68 are provided with lugs 70a in lieu of pins 70, which lugs support the end shields in a position of axial alignment and square with the stator casing 12. In FIG. 10 a heater 78a having inner and outer electrical resistance heaters 80a and 80b for locally heating the inner and outer cemented joints 39 and 39a is substituted for the heater 78 shown in FIG. 3.

The end shields of FIGS. 9 and 10 may be removed from the stator casing after the cement 39a has hardened, by the application of force with suitable tools, and while this method of detachable connection of the end shields does not permit the convenience of detachment provided by the bolts 48 and nuts 44, it is nevertheless an economical and practical construction, particularly for the smaller size motors, and provides completely free annular spaces between the faces of the stator core and the end shields in which cooling air may circulate uninterrupted and in which larger diameter circulating fans may operate.

ASSEMBLY OF MOTOR CONSTRUCTION SHOWN IN FIGS. 9 AND 10

The stator having been previously assembled and fixed in the cylindrical casing 12 with the annular machined surfaces 34 concentric with and in alignment with the stator bore 19, and the rotor having been previously assembled, including the assembly therewith of ball bearings 28–30, the completion of the assembly of the alternate motor construction shown in FIGS. 9 and 10, in accordance with the present invention, is as follows:

The rotor is positioned concentrically in the stator bore, and axially with respect to the stator, by means of circularly spaced shims 84 placed in the air gap between the rotor and stator bore, and the bearing locating rings 40 and 42 are slip fitted over the outer races of ball bearings. This assembly is then placed on the base 58 of fixture 56 with the locating pins 66 entering the holes 54 in the feet 52 on the stator casing with the feet resting on the spacers 67. This positions the axes of the rotor, the stator, and the fixture close to coaxial alignment.

A heat-curable, adhesive, epoxy resin cement is now applied as a bead, in paste form, near the outboard edges of the bearing locating rings, as shown at 39. The end shields are then placed on the end shield carrier members 68 in outward spaced relationship with the ends of the stator casing and are supported thereon in axial alignment and square with the axis of the fixture by the lugs 70a. The end shield carrier members are then moved inward until the end shield rims 32 are slipped over the closely fitting machined surfaces 34 and the internal faces of the end shields abut the ends of stator casing 12.

As the end shields are moved inward, the cementing material 39 is spread inwardly over the bearing locating rings to completely fill the annular spaces between the loosely fitting locating rings and the axial walls of the end shield recesses. An adhesive, epoxy resin cement in liquid form and having a low surface tension is now injected between the closely fitting end shield rims 32 and machined surfaces 34 on the stator casing and spreads by capillarity over and between these closely fitting surfaces.

The end shield carrier members are now removed and the heaters 78a are slidably mounted on the fixture and moved inward into contact with annular outer surface portions of the end shields overlying the inner and outer annular cemented joints, thereby to heat locally and harden the cement. After the cement has hardened, the shims are withdrawn through suitable, circularly spaced holes in one of the fans and in one of the end shields.

A considerable economy of costly cement is achieved in larger, ball bearing, take apart motors by accumulating variations from concentricity and alignment in the relatively small diameter, cemented, annular joints surrounding the bearing locating rings, as applicants have disclosed, as compared to arrangements in which the outer races of the ball bearings are slip fitted into recesses in the end shields and tolerances are taken up in considerably larger cemented joints at the peripheries of the end shields and stator assembly. The cost and quantity of cement employed in the thin, cemented joints connecting the peripheries of the end shields and stator in FIGS. 9 and 10 is relatively low, and this means of detachable connection is most practical in the smaller, integral-horsepower motors, this is to say, in the order of one to ten horsepower motors, which may be conveniently and economically removed from service for repairs to a shop equipped with the tool to remove the cemented end shields.

The foregoing description is intended to be illustrative and not limiting, the scope of the invention being set forth in the appended claims.

We claim:

1. A method of assembling a take apart, ball bearing electric motor in which a ball bearing is fixed on the rotor shaft, in which the stator assembly has a peripheral surface concentric with the stator bore, in which a bearing supporting end shield having a peripheral surface interfitting the peripheral surface on said stator is fitted on and detachably connected to the stator, and in which a member receiving the ball bearing in slip fit relationship is centrally positioned and cemented to the end shield, comprising the steps of assembling and temporaryily fixing the rotor coaxially in the stator by means of removable shims in the air gap, slip fitting the bearing receiving member on the ball bearing, applying a heat hardening adhesive cement in paste form to a surface of said bearing receiving member, moving said end shield axially inward into interfitting assembly with said stator and moving a surface of said end shield into juxtaposition with said surface of said bearing receiving member and into contact with the cement thereon, detachably connecting the end shield to the stator, applying heat locally to the cement and hardening it, and withdrawing the removable shims through access holes provided therefor.

2. The method as set forth in claim 1 in which detachable connection of the end shield to the stator is the last method step, and in which the method further includes the removal of the end shield following local heating and hardening of the cement for the purpose of withdrawing the shims and thereafter the replacement thereof in interfitting relationship with the stator.

3. A mehod of assembling a take apart, ball bearing electric motor having a ball bearing fixed on each end of the rotor shaft, in which the stator assembly has a peripheral surface at each end thereof concentric with the stator bore, in which bearing supporting end shields having peripheral surfaces interfitting the peripheral surfaces of the stator assembly are fitted on and detachably connected to the stator, and in which bearing receiving members having axially extending outer surfaces in overlapping and radially spaced relationship with axially extending surfaces on the end shields, and cemented to the end shields by a cement filling the spaces between these overlapping surfaces, receive the outer races of the ball bearings in slip fit relationship, comprising the steps of assembling and temporarily fixing the rotor coaxially in the stator by placing removable shims in the air gap, slip fitting the bearing receiving members on the outer races of the bearings, applying a heat hardening adhesive cement in paste form to the outer surfaces of said bearing receiving members in sufficient quantity to fill the spaces between them and said axially extending end shield surfaces, positioning said end shields in outward spaced relationship with the ends of said stator assembly and substantially concentric with said interfitting surfaces on said stator assembly, moving said end shields axially inwardly to interfitting assembly of said end shields on the ends of said stator assembly and moving said axially extending surfaces on said bearing receiving members and on said end shields in overlapping relationship, detachably connecting said end shields to the ends of said stator assembly, applying heat locally to the cement and hardening it, and withdrawing the removable shims through access holes in one end shield.

4. The method as set forth in claim 3 in which detachable connection of at least one end shield to the stator assembly is the last method step, and in which the method further includes the removal of one end shield following the heating and hardening of the cement for the purpose of withdrawing the shims and thereafter the replacement and the detachable connection thereof to the stator assembly.

5. The method of assembling a take apart, ball bearing electric motor similar to that in claim 3 further including annular bearing caps for locking or resiliently connecting the outer bearing races to the end shields, which bearing caps include circularly spaced, tapped holes receiving machine screws passing through clearance holes in the end shields, which method further includes with the steps of claim 3 the steps of angularly positioning the end shields about their axes when positioned in spaced relationship with the ends of said stator assembly so that the circularly spaced, tapped holes in the bearing caps register with similarly spaced machine screw clearance holes in the end shields, and in holding the end shields in this angular position while moving the end shields axially inward into interfitting assembly on the ends of said stator assembly.

6. The method of assembling a take apart, ball bearing electric motor similar to that described in claim 3 in which the means detachably connecting the end shields to the stator assembly includes circularly spaced screw threaded holes at the ends of the stator and clearance holes similarly spaced about the peripheries of the end shields through which attaching bolts pass, which comprises the steps set forth in claim 3, and further includes lining up the bolt clearance holes in the end shields with the threaded holes at the ends of the stator shell when the end shields are positioned in axial spaced relationship with the ends of the stator assembly, and in maintaining these clearance holes in alignment with the screw threaded holes while moving the end shields axially inward into interfitting assembly on the ends of the stator assembly.

7. The method of assembling a take apart, ball bearing electric motor similar to that described in claim 3 in which the means detachably connecting the end shields to the stator assembly comprises a thin, breakable, cemented joint between the interfitting surfaces of the stator assembly and the end shields, which comprises the steps set forth in claim 3 and in which the method step of detachably connecting the end shields to the stator assembly comprises injecting an adhesive heat hardening cement in liquid form between the interfitting surfaces of said end shields and stator assembly, which cement is capable of dispersion over the interfitting surfaces by capillarity, and in which the step of applying heat locally to the cement and hardening it includes the cemented joints at the peripheries of the end shields and the stator assembly.

References Cited

UNITED STATES PATENTS

| | | | |
|---|---|---|---|
| 3,165,816 | 1/1965 | Thompson et al. | 29—596 |
| 3,359,628 | 12/1967 | Rutledge et al. | 29—596 |
| 3,388,459 | 6/1968 | Dochterman | 29—596 |
| 3,437,853 | 4/1969 | Arnold | 29—596 X |

JOHN P. CAMPBELL, Primary Examiner

C. E. HALL, Assistant Examiner

U.S. Cl. X.R.

310—42, 90